US012566335B2

(12) United States Patent
Mueller et al.

(10) Patent No.: US 12,566,335 B2
(45) Date of Patent: Mar. 3, 2026

(54) MULTIPLEXED HOLOGRAM INTERFERENCE EXPOSURE SYSTEM

(71) Applicant: Applied Materials, Inc., Santa Clara, CA (US)

(72) Inventors: Ulrich Mueller, Berkeley, CA (US); David Markle, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 410 days.

(21) Appl. No.: 17/919,017

(22) PCT Filed: Jan. 20, 2021

(86) PCT No.: PCT/US2021/014227
§ 371 (c)(1),
(2) Date: Oct. 14, 2022

(87) PCT Pub. No.: WO2021/221742
PCT Pub. Date: Nov. 4, 2021

(65) Prior Publication Data
US 2023/0296907 A1    Sep. 21, 2023

Related U.S. Application Data

(60) Provisional application No. 63/019,003, filed on May 1, 2020.

(51) Int. Cl.
*G02B 27/09* (2006.01)
*G02B 26/08* (2006.01)
*G02B 27/28* (2006.01)

(52) U.S. Cl.
CPC ..... *G02B 27/0927* (2013.01); *G02B 26/0816* (2013.01); *G02B 27/283* (2013.01)

(58) Field of Classification Search
CPC ............ G02B 27/0927; G02B 26/0816; G02B 27/283

(Continued)

(56) References Cited

U.S. PATENT DOCUMENTS 5,622,567 A * 4/1997 Kojima ............... C23C 14/3471
427/596
10,481,408 B2 11/2019 Adema et al.

(Continued)

FOREIGN PATENT DOCUMENTS

CN 108761603 A 11/2018
JP 2005156434 A 6/2005

(Continued)

OTHER PUBLICATIONS

International Search Report and Written Opinion dated May 14, 2021 for Application No. PCT/US2021/014227.

(Continued)

*Primary Examiner* — Bumsuk Won
*Assistant Examiner* — Grant A Gagnon
(74) *Attorney, Agent, or Firm* — Patterson + Sheridan, LLP

(57) ABSTRACT

The present disclosure provides an apparatus and method for fabricating optical devices. The apparatus includes a support table having process chambers and a laser used to direct a beam along a propagation path to each of the process chambers. A central mirror is centrally disposed among the process chambers and is rotatable to reflect the beam to each of the process chambers for processing. A beam splitter is disposed within each of process chambers, each beam splitter is used to receive beams from the central mirror and emits a first beam in a first direction and a second beam in a second direction. A first mirror directs the first beam to a device and a second mirror directs the second beam to the (Continued)

device. Each of the first and second mirror is rotatable in at least three axes.

20 Claims, 10 Drawing Sheets

(58) Field of Classification Search
USPC .......................................................... 359/619
See application file for complete search history.

(56) References Cited

U.S. PATENT DOCUMENTS

| | | | |
|---|---|---|---|
| 2015/0234350 A1 | 8/2015 | Park et al. | |
| 2017/0329280 A1 | 11/2017 | Rosen et al. | |
| 2018/0203413 A1 | 7/2018 | Zhang | |
| 2018/0212397 A1 | 7/2018 | Wang et al. | |

FOREIGN PATENT DOCUMENTS

| | | | |
|---|---|---|---|
| KR | 19990005335 A | 1/1999 | |
| TW | I524091 B | 3/2016 | |

OTHER PUBLICATIONS

Taiwanese Office Action for Application No. 110102465 mailed Oct. 1, 2025.
Taiwan Office Action dated Mar. 7, 2025 for Application No. 110102465.

* cited by examiner

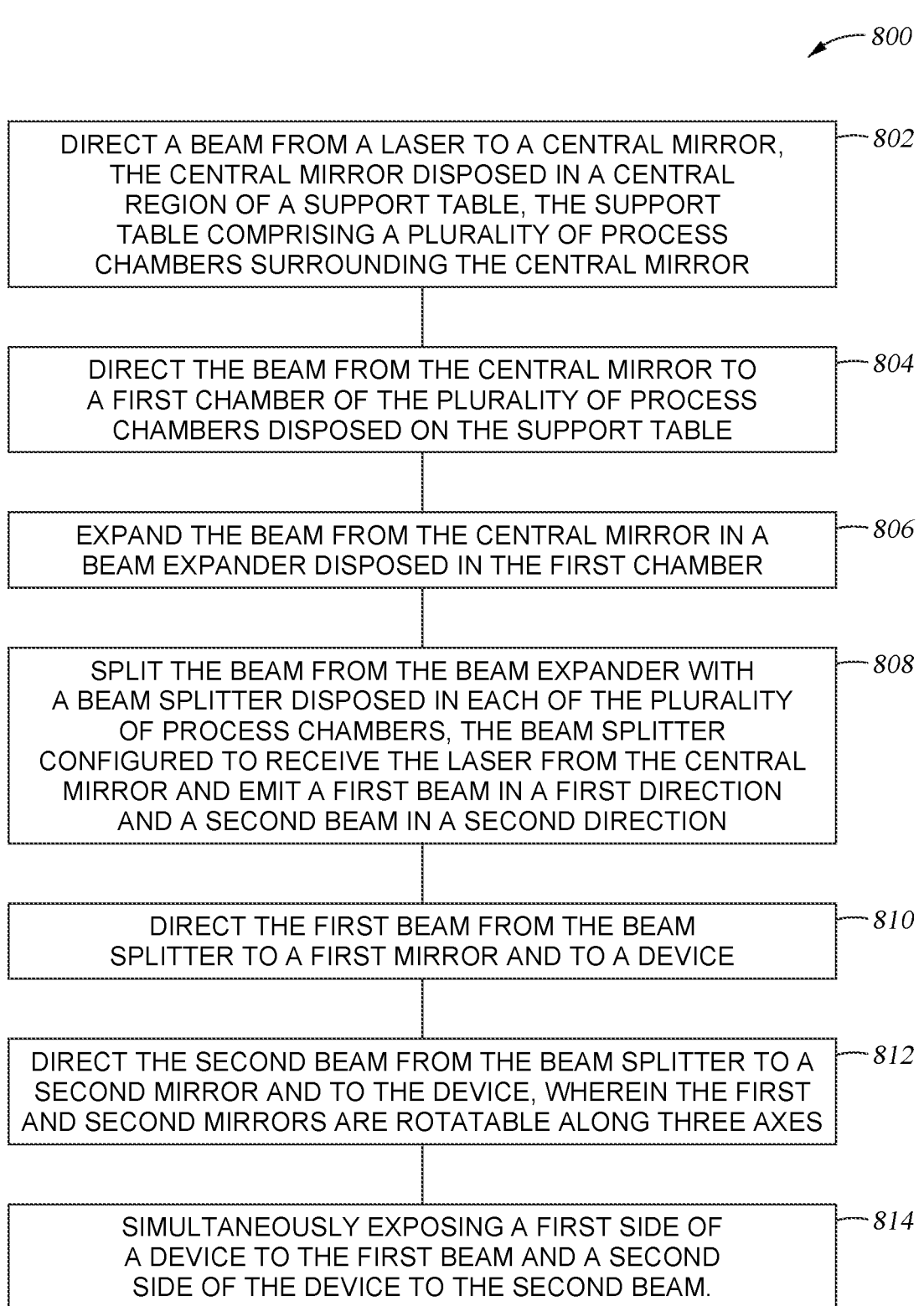

*800*

DIRECT A BEAM FROM A LASER TO A CENTRAL MIRROR,
THE CENTRAL MIRROR DISPOSED IN A CENTRAL
REGION OF A SUPPORT TABLE, THE SUPPORT
TABLE COMPRISING A PLURALITY OF PROCESS
CHAMBERS SURROUNDING THE CENTRAL MIRROR — *802*

DIRECT THE BEAM FROM THE CENTRAL MIRROR TO
A FIRST CHAMBER OF THE PLURALITY OF PROCESS
CHAMBERS DISPOSED ON THE SUPPORT TABLE — *804*

EXPAND THE BEAM FROM THE CENTRAL MIRROR IN A
BEAM EXPANDER DISPOSED IN THE FIRST CHAMBER — *806*

SPLIT THE BEAM FROM THE BEAM EXPANDER WITH
A BEAM SPLITTER DISPOSED IN EACH OF THE PLURALITY
OF PROCESS CHAMBERS, THE BEAM SPLITTER
CONFIGURED TO RECEIVE THE LASER FROM THE CENTRAL
MIRROR AND EMIT A FIRST BEAM IN A FIRST DIRECTION
AND A SECOND BEAM IN A SECOND DIRECTION — *808*

DIRECT THE FIRST BEAM FROM THE BEAM
SPLITTER TO A FIRST MIRROR AND TO A DEVICE — *810*

DIRECT THE SECOND BEAM FROM THE BEAM SPLITTER TO A
SECOND MIRROR AND TO THE DEVICE, WHEREIN THE FIRST
AND SECOND MIRRORS ARE ROTATABLE ALONG THREE AXES — *812*

SIMULTANEOUSLY EXPOSING A FIRST SIDE OF
A DEVICE TO THE FIRST BEAM AND A SECOND
SIDE OF THE DEVICE TO THE SECOND BEAM. — *814*

*Fig. 8*

MULTIPLEXED HOLOGRAM INTERFERENCE EXPOSURE SYSTEM

BACKGROUND

Field

Embodiments of the present disclosure generally relate to a multiplex hologram generating system.

Description of the Related Art

Generating holograms involves directing two interfering beams to form a pattern on a device. Automated systems are used to generate holograms by multiplexing lasers and by using phase gratings to generate coherent beams with equal intensity and good uniformity. Multiplexing techniques are used to improve system capacity by using grating structures to diffract (e.g., reflect) beams from a single laser to a device. Generating a single beam to write holograms typically includes adjustments of multiple linear and rotary axes to steer the beams to the correct locations and additional time before exposure to enable vibration generated by the motion to dissipate. Inefficiencies associated with the time for dissipation often leads to limited productivity and low utilization of the laser. Additional lasers used to increase throughput can lead to increased cost and potentially a larger system footprint.

Therefore, there is a need for an improved apparatus and methods of writing high quality holograms on multiple devices with increased productivity.

SUMMARY

In one embodiment, an apparatus is provided for fabricating optical devices. The apparatus includes a support table having process chambers and a laser used to direct a beam along a propagation path to each of the process chambers. A central mirror is centrally disposed among the process chambers and is rotatable to reflect the beam to each of the process chambers for processing. A beam splitter is disposed within each of the process chambers and each beam splitter is used to receive beams from the central mirror and emit a first beam in a first direction and a second beam in a second direction. A first mirror directs the first beam to a device and a second mirror directs the second beam to the device. Each of the first mirror and second mirror is rotatable in three axes.

In one embodiment, an apparatus is provided for fabricating hologram devices. The apparatus includes a support table having process chambers and a laser to direct a beam along a propagation path to each of the process chambers. A central mirror is disposed in a center region of the support table and the process chambers surround the center region of the support table. A beam converting optic is used to receive a beam from the laser and emit the beam to the central mirror and the optic is positioned to receive the beam having a first intensity profile and to emit the beam having a second intensity profile. The central mirror is used to sequentially direct the beam from the laser to each of the plurality of process chambers. A beam splitter is disposed within each of the process chambers and is used to receive the laser from the central mirror and emit a first beam in a first direction and a second beam in a second direction. The apparatus includes a first mirror used to direct the first beam to an optical target and a second mirror used to direct the second beam to the optical target. Each of the first mirror and second mirror is rotatable in at least three axes.

In one embodiment, a method is provided for fabricating hologram devices. The method includes directing a beam from a laser to a central mirror disposed in a central region of a support table. The support table includes process chambers surrounding the central mirror. The method includes directing the beam from the central mirror to a first chamber of the process chambers disposed on the support table. The beam travels along a propagation path from the central mirror to a beam expander which expands the beam. The expanded beam is split with a beam splitter disposed in each of the process chambers. The beam splitter is used to receive the laser from the central mirror and emit a first beam in a first direction and a second beam in a second direction. The first beam from the beam splitter is directed to a first mirror which is used to direct the beam to a device and the second beam from the beam splitter is directed to a second mirror which is used to direct the beam to the device. The first and second mirrors are rotatable in at least three axes. The method includes simultaneously exposing a first side of a device to the first beam and a second side of the device to the second beam to form the hologram device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only example embodiments of this disclosure and are therefore not to be considered limiting of its scope, for the disclosure may admit to other equally effective embodiments.

FIG. 8 depicts a flow diagram of an example method in accordance with one embodiment of the present disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to an apparatus and method for fabricating hologram devices. The apparatus includes a support table having process chambers and a laser used to direct a beam along a propagation path to each of the process chambers. A central mirror is centrally disposed among the process chambers and is rotatable to reflect the beam to each of the process chambers for processing. A beam splitter is disposed within each of process chambers, each beam splitter is used to receive beams from the central mirror and emit a first beam in a first direction and a second beam in a second direction. A first mirror directs the first beam to a device and a second mirror directs the second beam to the device. Each of the first mirror and second mirror is rotatable in three axes.

Figure 1A:
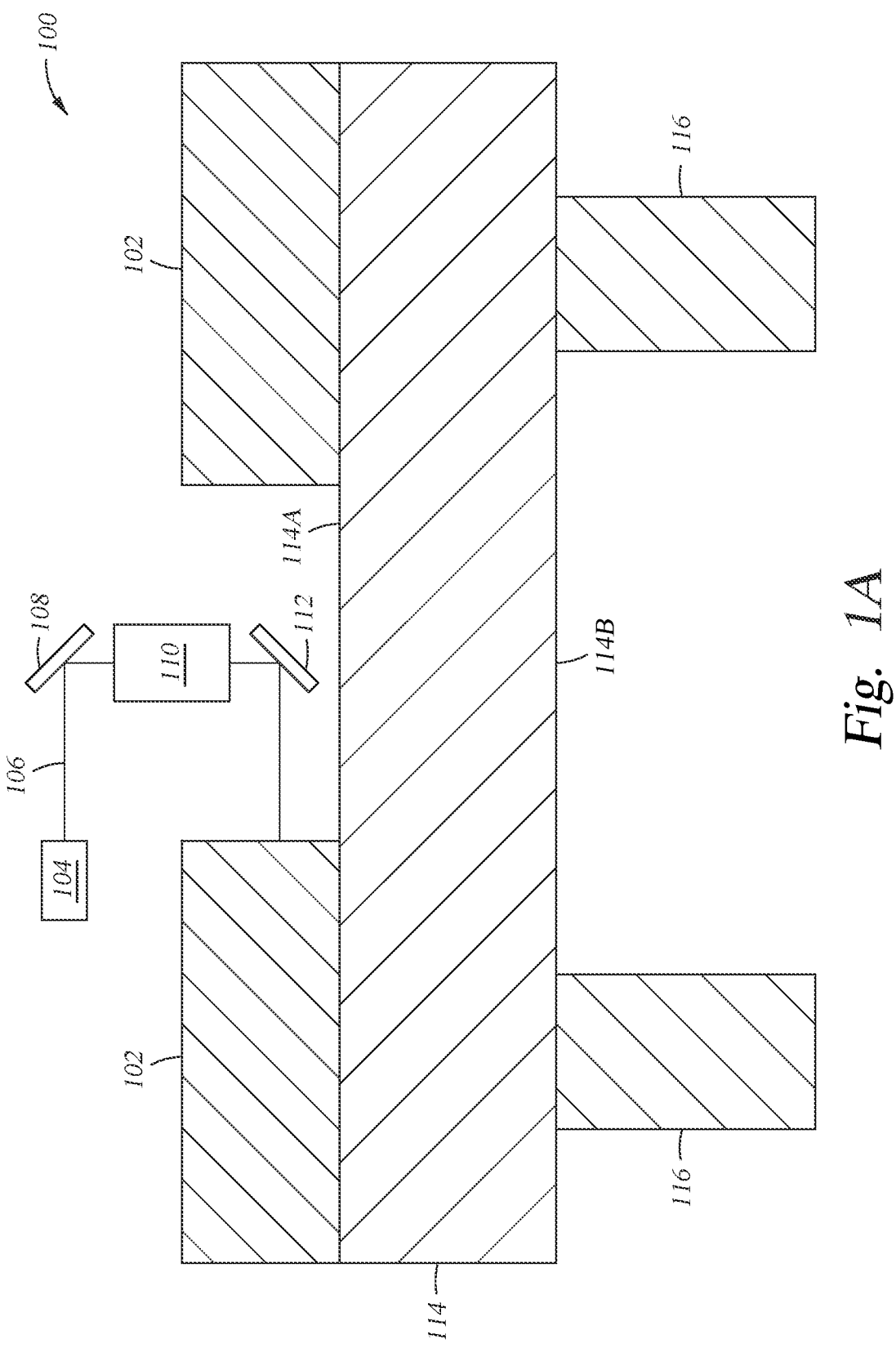
FIG. 1A depicts a cross-sectional side view of a multiplex hologram system having a laser disposed above an example support table in accordance with one embodiment of the present disclosure.
Figure 1B:
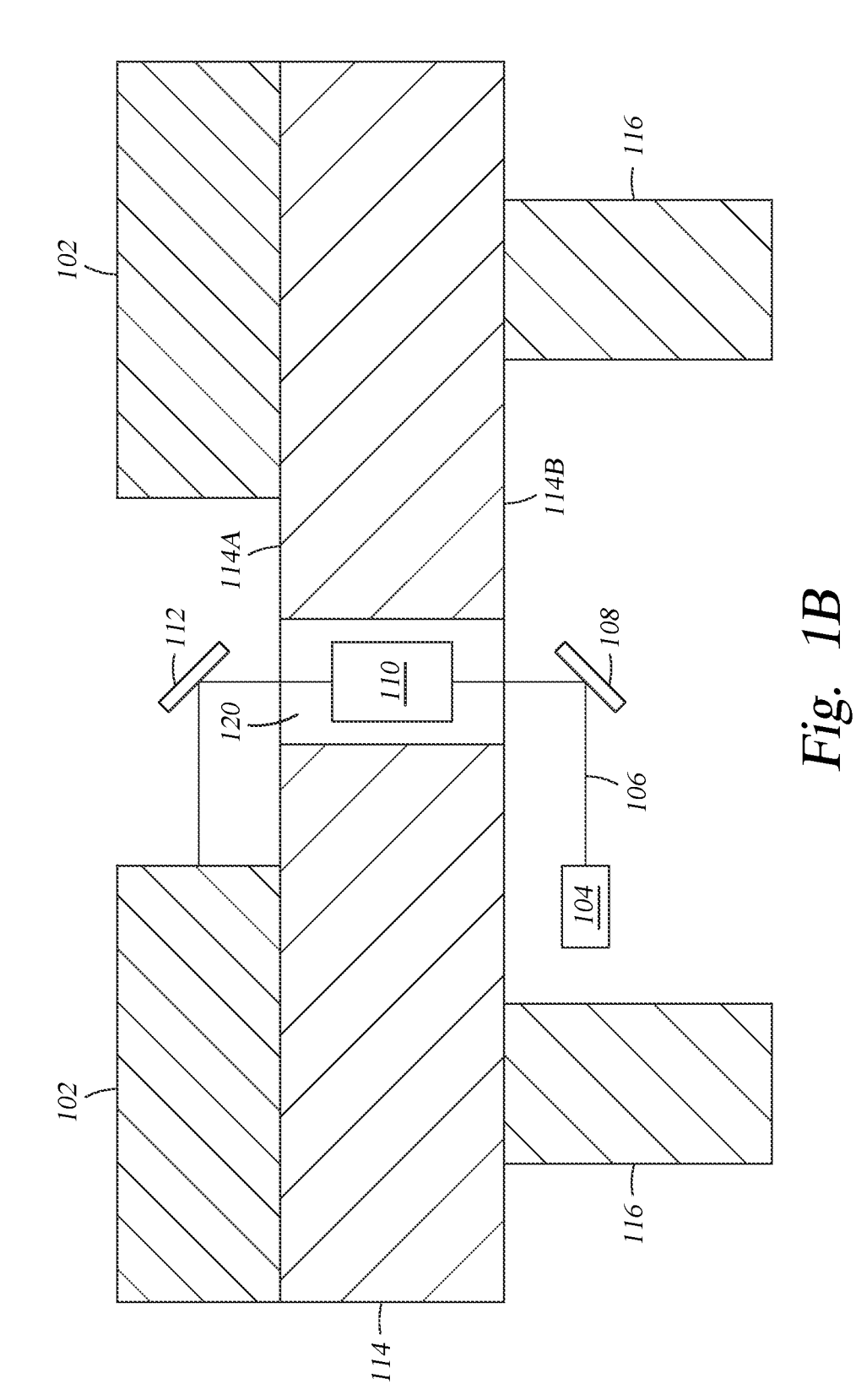
FIG. 1B depicts a cross-sectional side view of a multiplex hologram system having a laser disposed below an example support table in accordance with one embodiment of the present disclosure.

FIG. 1A depicts a side view of the multiplex hologram system 100 having a laser 104 disposed above a support table 114 and FIG. 1B depicts the laser 104 disposed below the support table 114 in accordance with an embodiment of the present disclosure. The support table 114 includes a first surface 114A, a second surface 114B, and a support structure 116. The first surface 114A and second surface 114B are disposed opposite and parallel one another. In one embodiment, the first surface 114A is a top surface of the support table 114 and the second surface 114B is a bottom surface of the support table 114. Suitable support tables 114 include structure made from stiff materials or material having a relatively high moment of inertia, such as granite, composite, steel, aluminum, or combinations thereof. The support table 114 includes materials and features to dampen vibrations produced from processes conducted on the support table surface 114A. For example, various dampers, springs, vibration isolating members, and the like may be implemented with or integrated into the support table 114 to facilitate a reduction in vibration or movement of the support table 114. A plurality of process chambers 102 are disposed on the support table 114. In the illustrated embodiments, the process chamber 102 are disposed on or coupled to the first surface 114A.

In some embodiments, which can be combined with other embodiments described herein, the laser 104 is located adjacent to the first surface 114A of the support table 114 (as shown in FIG. 1A). The laser 104 directs an incident light beam (e.g., beam) along propagation path 106 to each chamber of the plurality of process chambers 102. The beam is reflected from an optic assembly 108 to a beam converting optic 110. The beam converting optic 110 converts the intensity profile of the beam from a first intensity profile to a second intensity profile. The first intensity profile is a Gaussian-like shape and the second intensity profile is a flat top shape. For example, the first intensity profile is substantially non-uniform over a radial distance from a center of the beam while the second intensity profile is substantially uniform over a radial distance of the beam. The beam is reflected to a central mirror 112. The central mirror 112 is disposed in a center region of the support table 114 and the process chambers 102 surround the center region of the support table 114. The central mirror 112 is rotatable along a vertical axis and is used to direct the propagation path 106 of the beam sequentially to each of the process chambers 102.

In some embodiments, which can be combined with other embodiments described herein, the laser 104 is located adjacent to the second surface 114A of the support table 114 (as shown in FIG. 1B). The optic assembly 108 is disposed adjacent to the second surface 114A and reflects the beam from the laser 104 to the central mirror 112 through an opening 120 of the support table 114. The central mirror 112 is disposed adjacent to the first surface 114A of the support table 114 and is rotatable about the vertical axis to direct the beam along a propagation path 106 to each of the process chambers 102.

In some embodiments, which can be combined with other embodiments described herein, the laser 104 is a tunable laser which has a wavelength selected to expose a material at a desired wavelength, such as a titanium sapphire laser, an argon ion laser, or the like. The laser 104 is a high polarization purity laser. In one embodiment, which can be combined with other embodiments described herein, the laser 104 is a coherent single lateral mode laser. The laser 104 has a wavelength within the ultraviolet spectrum, or within the visible spectrum. In some embodiments, which can be combined with other embodiments described herein, the laser has a wavelength of about 300 nm to about 600 nm, such as about 400 nm to about 450 nm, and/or a line width of about 4 mHz to about 6 mHz, such as about 4.5 mHz to about 5 mHz.

The laser 104 is directed to the optic assembly 108. In some embodiments, which can be combined with other embodiments described herein, the optic assembly 108 is a mirror, such as a coated glass mirror, for example, a borosilicate mirror. Examples of coatings include aluminum or multi-layer dielectric materials selected to reflect at a predetermined wavelength, such as a wavelength of the laser 104. In some embodiments, the coating is a metal coating with a protective layer. The optic assembly 108 is angled to reflect the beam to the beam converting optic 110, or the central mirror 112. The optic assembly 108 is angled to align the propagation path 106 with the converting optic 110 or the central mirror 112. The optic assembly 108 is angled about 40° to about 50°, such as 45°, relative to the propagation path 106. The laser beam is angled at about 85° to about 95°, such as about 90° relative to the laser 104 after reflecting from the optic assembly 108. In some embodiments, which can be combined with other embodiments described herein, the optic assembly 108 is a prism, such as a prism. In this embodiment, the prism is fabricated from a glass or glass-like material and may include one or more coating materials. The prism is a 90° prism (45°–45°–90°). The beam is incident on the prism perpendicular to a first face of the prism and has total internal reflection therethrough causing the beam to deviate by 90° and to exit the prism perpendicular to a second face of the prism. The first and second face of the prism are equal in length, and a third face of the prism is a hypotenuse of the prism. Other prisms dimensions are used to accommodate different positioning of lasers 104 relative to the prism depending on environmental considerations such as overhang space, a size of the support table 114, or the optical characteristics of the prism. In some embodiments, which can be combined with other embodiments described herein, the prism is a pentaprism.

As shown in FIG. 1A, the laser 104, the optic assembly 108, the beam converting optic 110, the process chambers 102, and the central mirror 112 are disposed adjacent to the first surface 114A of the support table 114. Alternatively, as shown in FIG. 1B, the laser 104 and the optic assembly 108 are disposed adjacent to the second surface 114A of the support table 114. The beam is reflected from the optic assembly 108 in about a 90° angle to the beam converting optic 110 or the beam is reflected from the optic assembly 108 to the central mirror 112. The beam converting optic 110 is disposed within an opening 120 of the support table 114, or the beam converting optic 110 is disposed adjacent to the second surface 114A of the support table 114, or the beam converting optic 110 is disposed adjacent to the first surface 114A of the support table 114. The beam converting optic 110 is disposed before the central mirror 112 along the propagation path 106, or the beam converting optic 110 is disposed after the central mirror 112 along the propagation path 106.

Positioning the beam converting optic 110 between the optic assembly 108 and the central mirror 112 along the propagation path 106 enables a single beam converting optic 110 to be used, rather than using a beam converting optic 110 within each process chamber 102. Additionally, positioning the beam converting optic 110 between the optic assembly 108 and the central mirror 112 along the propagation path 106 enables adequate beam intensity uniformity in some applications. Although the beam converting optic 110 is disposed further away from each process chamber 102 along the propagation path 106, the beam exiting the beam converting optic 110 is uniform, and retains adequate intensity uniformity for use in each process chamber 102. As such, a trade-off is achieved by reducing the number of beam converting optics 110 while maintaining sufficient beam intensity uniformity for a particular process.

Alternatively, the beam is reflected from the optic assembly 108 to the central mirror 112 and to the beam converting optic 110 disposed within each process chamber 102. In such an arrangement, the beam is directed within each process chamber 102 with a highly uniform intensity profile, such as a top hat profile. Without being bound by theory, in some applications, a high level of uniformity of beam intensity profile is used and is achieved by positioning the beam converting optic 110 in close proximity to the process chamber 102, or within the process chamber 102. The close proximity placement of the beam converting optic 110 reduces the possibility of the beam intensity profile reverting back to a more gaussian-like profile.

Figure 2A:
FIG. 2A depicts a plan view of the multiplex hologram system having eight process chambers in accordance with one embodiment of the present disclosure.

The central mirror 112 is disposed in a center region of the support table 114, and the process chambers 102 surround the center region of the support table 114. The number and arrangement of the process chambers 102 depends on the size allowance of the supporting table 114, the hologram device throughput target, and environmental considerations. FIG. 2A depicts a plan view of the multiplex hologram system 100 having eight process chambers 102 and FIG. 2B depicts a plan view of the multiplex hologram system 100 having four process chambers 102 in accordance with some embodiments of the present disclosure.

In some embodiments, which can be combined with other embodiments disclosed herein, the multiplex hologram system 100 includes about 2 to about 12 process chambers, such as about 2 to about 10 process chambers, such as about 4 to about 6 process chambers, or about 6 to about 8 process chambers. As shown in FIG. 2A, the process chambers 102 are arranged around the central mirror 112 in a uniform, circular arrangement, such as for a square or circular support table 114. Alternatively, as shown in FIG. 2B, alternative arrangements are possible, such as for a rectangular or oval support table 114. As such, additional beam diverting assemblies 202 are used to direct the beams from the central mirror 112 to the processing assemblies 102. The beam diverting assemblies 202 are fixed glass mirrors or prisms configured to reflect beams from the central mirror 112 to the process chambers 102. The central mirror 112 is rotatable about a vertical axis and configured to rotate and direct beams sequentially to each of the beam diverting assemblies 202.

Figure 3:
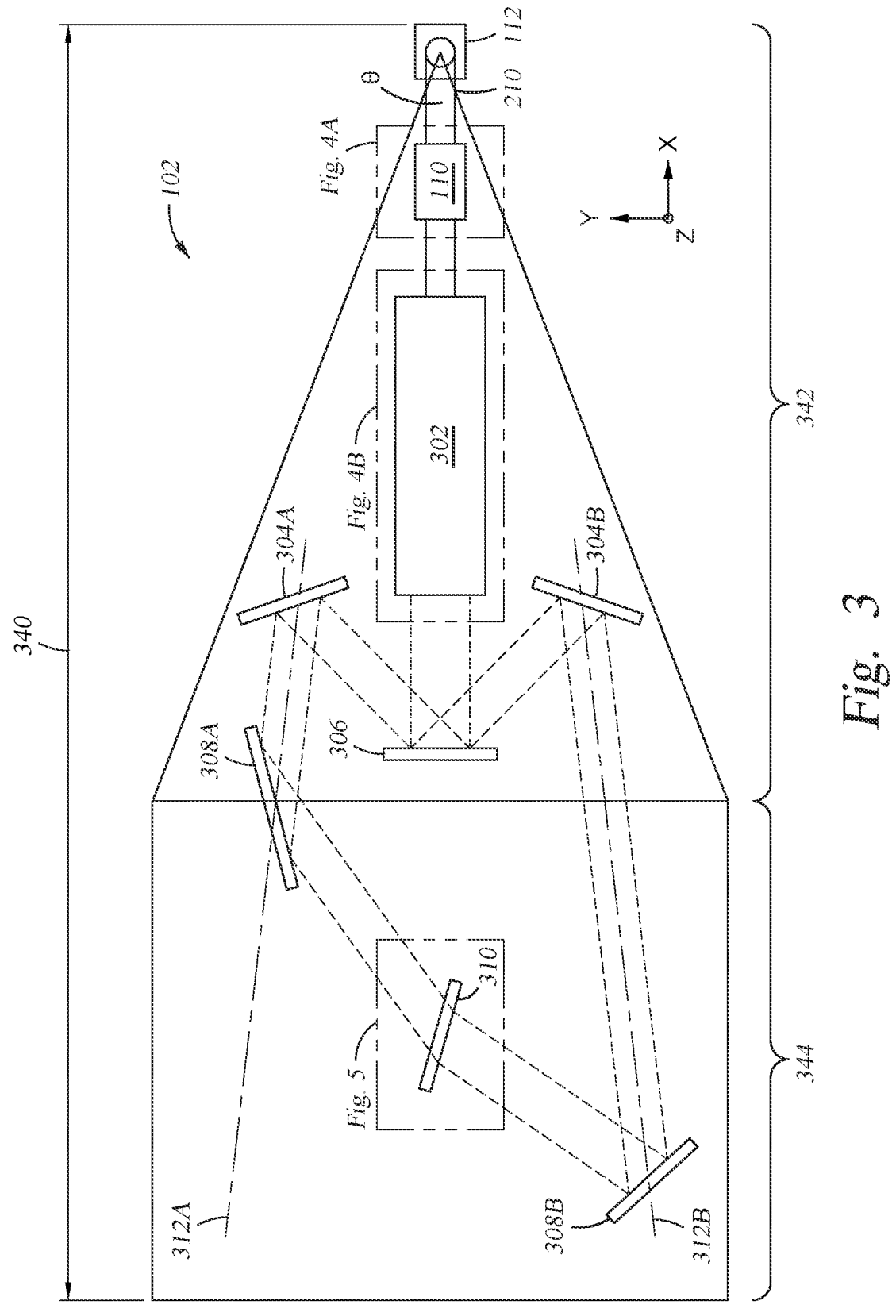
FIG. 3 depicts a schematic plan view of an example process chamber of the multiplex hologram system in accordance with one embodiment of the present disclosure.

FIG. 3 depicts a plan view of an example process chamber 102 of the multiplex hologram system 100 in accordance with one embodiment of the present disclosure. Each process chamber 102 has a first chamber region 342 and a second chamber region 344. The first chamber region 342 is substantially triangular in shape with an angle θ from the centermost portion of the first chamber region 342. The angle θ is determined based on a number of process chambers 102 disposed about the support table 114. In some embodiments, which can be combined with other embodiments disclosed herein, the multiplex hologram system 100 includes about 6 process chambers 102 and the angle θ is about 50 degrees to about 60 degrees, or the multiplex hologram system 100 includes about 8 process chambers 102 and the angle θ is about 35 degrees to about 45 degrees. It is contemplated that other non-triangular shapes may be utilized for the first chamber region 342 depending upon the desired implementation.

Figure 2B:
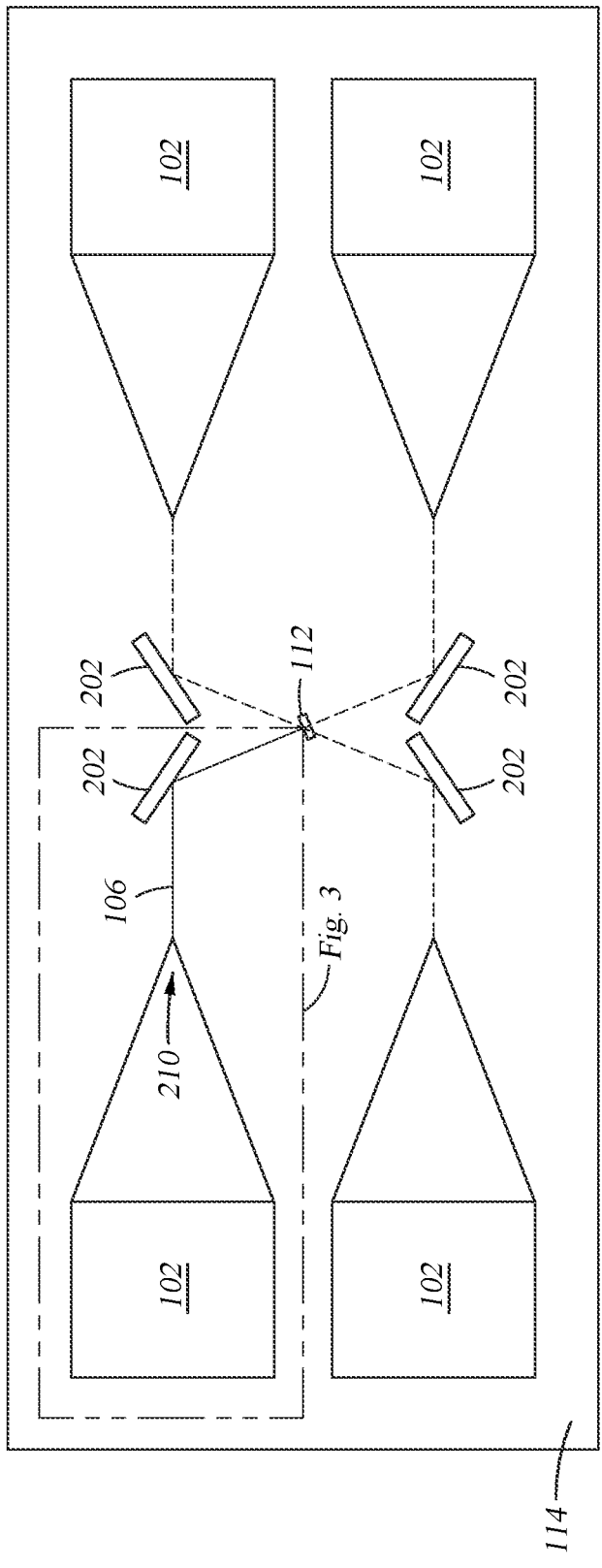
FIG. 2B depicts a plan view of the multiplex hologram system having four process chambers in accordance with one embodiment of the present disclosure.

The beam from central mirror 112 (e.g., as shown in FIG. 2A) or from a beam diverting assembly 202 (e.g., as shown in FIG. 2B) enters the process chamber 102 from the centermost portion 210 of the first chamber region 342. The beam enters the beam converting optic 110, or a beam expander 302. The beam expander 302 is configured to receive a beam with a first beam size in an input end of the beam expander 302, and emit a beam with a second beam size in an output end of the beam expander 302. The second beam size is larger than the first beam size. For example, a diameter of the first beam is about 0.5 mm and about 3 mm, such as about 1 mm to about 2 mm. A diameter of the second beam (e.g., spot size 604 shown in FIG. 6B) is the square root of 2 times larger than a desired diameter (e.g., for circular devices) or diagonal (e.g., for square shaped devices) of an exposure area (e.g., 602 shown in FIG. 6B). The expanded beam is directed to a beam splitter 306 which splits the expanded beam into a first and second beam. The first beam is directed in a first direction to a first mirror 304A and the second beam is directed in a second direction to a second mirror 304B. The first and second mirrors 304A, 304B are fixed mirrors. The first mirror 304A is angled to direct the beam in a first scan axis 312A. The second mirror 304B, is angled to direct the beam in a second scan axis 312B. The angles of the first and second mirrors 304A, 304B are determined by the angles of the incoming beams from the beam splitter 306 and the relative position of the first and second mirrors 304A, 304B from the first and second scan axis 312A, 312B. In one embodiment, which can be combined with other embodiments described herein, the first and second mirrors 304A, 304B are angled between about 0 degrees to 90 degrees relative to the horizontal axis.

A third mirror 308A, disposed along the first scan axis 312A, is movable along the first scan axis, and is rotatable in all directions. In some embodiments, which can be combined with other embodiments described herein, the third mirror 308A is rotatable about three axes of rotation, or up to six axes of rotation. The third mirror 308A is movable to direct the first beam to the device 310 at a plurality of directions. A fourth mirror 308B, disposed along the second scan axis 312B, is movable along the second scan axis 312B, and is rotatable in all directions. In some embodiments, which can be combined with other embodiments described herein, the fourth mirror 308B is rotatable about three axes of rotation, or up to six axes of rotation. The fourth mirror 308B is movable to direct the second beam to the device 310 at a plurality of directions. Interference between the first beam and second beam include good modulation and create lines written on the device. Each of the third and fourth mirror 308A, 308B is disposed on a parallel positioner, such as a hexapod, or a stacked serial kinematic system. In some embodiments, which can be combined with other embodiments described herein, the third mirror 308A is linearly movable along the first scan axis 312A and capable of tilting in clockwise and counter clockwise rotational directions about the first scan axis 312A. The third mirror 308A is capable of tilting in clockwise and counter clockwise rotational directions about an axis perpendicular to the first scan axis 312A. The third mirror 308A is capable of tilting in clockwise and counter clockwise rotational directions about an axis normal to the first scan axis 312A. In some embodiments, which can be combined with other embodiments described herein, the third mirror 308A is capable of tilting in clockwise and counter clockwise rotational directions about the X-axis, the Y-axis, and the Z-axis.

In some embodiments, which can be combined with other embodiments described herein, the fourth mirror 308B is linearly movable along the second scan axis 312B and capable of tilting in clockwise and counter clockwise rotational directions about the second scan axis 312B. The fourth mirror 308B is capable of tilting in clockwise and counter clockwise rotational directions about an axis perpendicular to the second scan axis 312B. The fourth mirror 308B is capable of tilting in clockwise and counter clockwise rotational directions about an axis normal to the second scan axis 312B. In some embodiments, which can be combined with other embodiments described herein, the third mirror 308B is capable of tilting in clockwise and counter clockwise rotational directions about the X-axis, the Y-axis, and the Z-axis.

The third mirror 308A and the fourth mirror 308B are capable of tilting in the manner described and translating about the scan axes 312A, 312B while redirecting beams to the device. The beams from the third mirror 308A and the fourth mirror 308B interfere with one another within the device and the overlapped waves of the beams are recorded on to the device to generate a hologram. In some embodiments, which can be combined with other embodiments described herein, the third mirror 308A and the fourth mirror 308B move in a predetermined motion such that beams from each mirror spatially coincide within the device to create a plurality of multiplexed holograms. In particular, the two beams from two different directions interfere in phase or out of phase with one another to create a fringe pattern having a highly localized energy which changes the chemical composition within and/or on a layer disposed on the device and the pattern is stored a one or more holograms.

Figure 4:
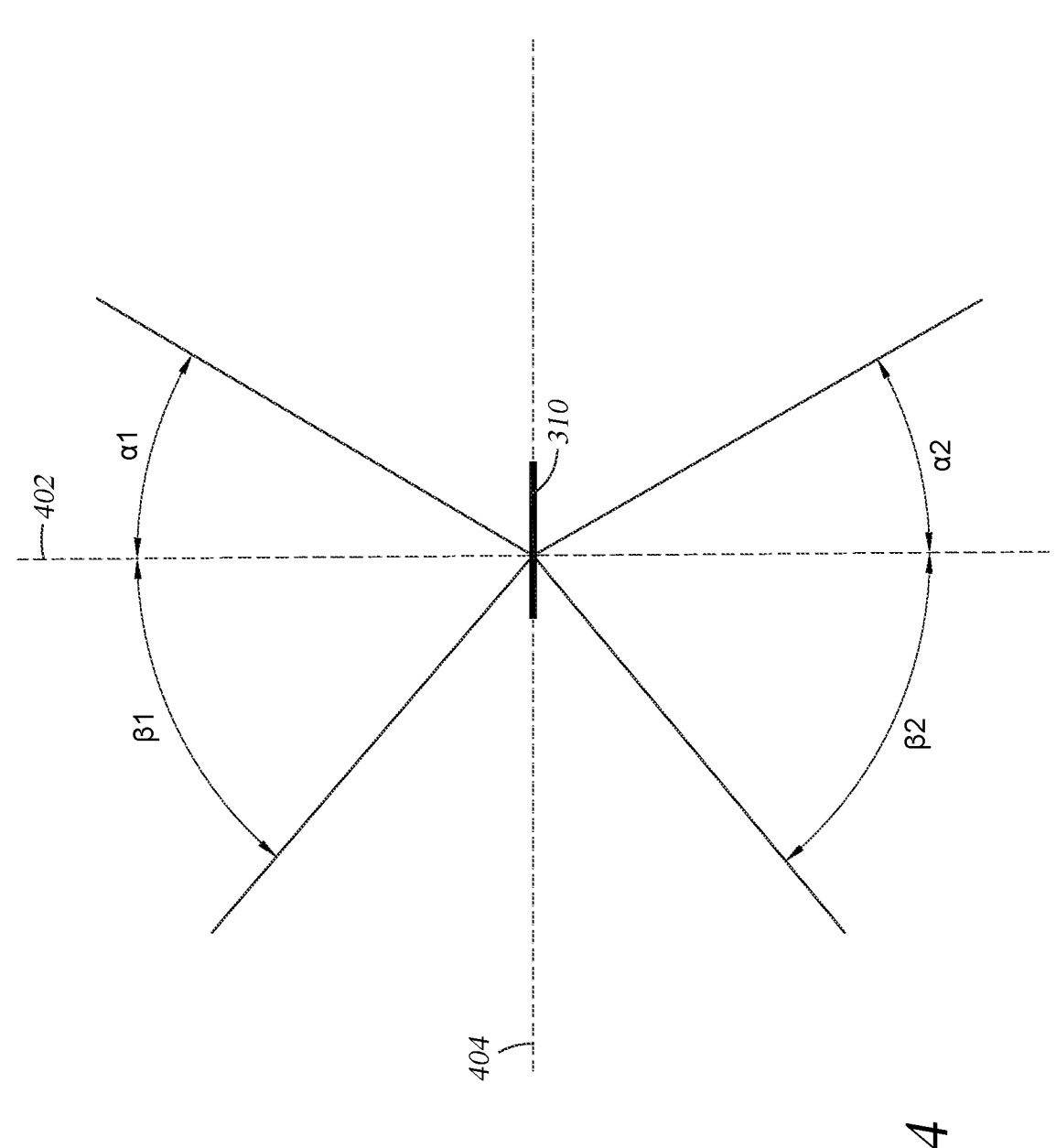
FIG. 4 depicts a schematic plan view showing the range of angles in which a first and second beam are directed onto a device in accordance with one embodiment of the present disclosure.

FIG. 4 depicts a schematic plan view showing the range of angles in which the first and second beams are directed onto the device 310. The device 310 is maintained in a stationary position along a first axis 404. In some embodiments, which can be combined with other embodiments described herein, the device 310 is rotatable and capable of tilting from a stationary location, such as an intersection of the first axis 404 and a second axis 406. The third mirror 308A directs the first beam to the device 310 at angles within the first angle α1 and/or the second angle β1, by translating along the first scan axis 312A, rotating and/or tilting to direct the first beam at predetermined angles. The fourth mirror 308A directs the first beam to the device 310 at angles within the third angle α2 and/or the fourth angle β2, by translating along the second scan axis 312B, rotating and/or tilting to direct the first beam at predetermined angles. The angles α1 and α2 are about 30 degrees to about 45 degrees, such as about 35 degrees. The angles β1 and β2 are about 40 degrees to about 55 degrees, such as about 45 degrees. In some embodiments, which can be combined with other embodiments described herein, the angles α1 and β1 are equal, meaning the total angle is symmetric about the second axis 402. Alternatively, α1 is less than 1. In some embodiments, which can be combined with other embodiments described herein, the angles α2 and β2 are equal, meaning the total angle is symmetric about the plane 402. Alternatively, α2 is less than β2.

In some embodiments, which can be combined with other embodiments described herein, the device 310 is movable along the first axis 404. In some embodiments, which can be combined with other embodiments described herein, the device 310 is rotatable and/or able to tilt while moving along the first axis 404, such as on a linear track. In some embodiments, the device 310 is movable at least along the first axis 404 and the second axis 406. The operation, the third and fourth mirrors 308A, 308B are disposed in stationary positions, such on opposing sides of the device 310 along the second axis 402, and are capable of tilting and/or rotating to direct the first and second beams to the device 310.

Figure 5A:
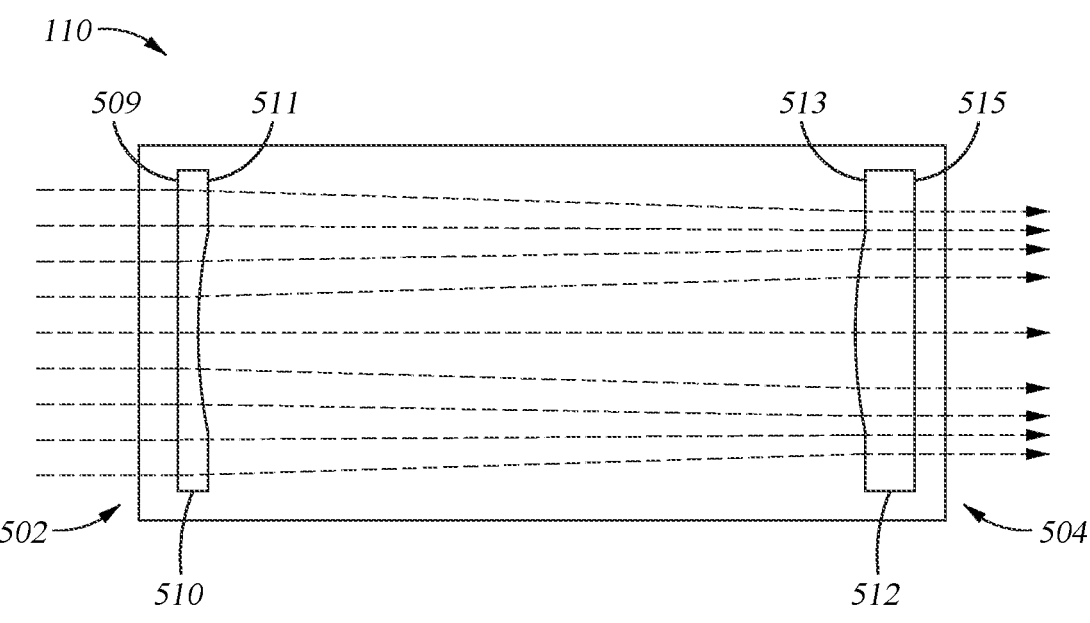
FIG. 5A depicts a side cross-sectional schematic view of a beam converting optic in accordance with one embodiment of the present disclosure.

FIG. 5A depicts a side cross-sectional schematic view of a beam converting optic 110. The beam converting optic 110 has a first aspheric lens 510 disposed at or proximate to a input end 502 and a second aspheric lens 512 at or proximate to an output end 504. The beam enters in the input end 502 of the beam converting optic 110 with a maximum intensity at the central axis of the beam and the intensity of the beam tapers (e.g., decays) radially outward from the central axis of the beam. As used herein, the intensity profile described with reference to the beam entering the input end 502 of the beam converting optic 110 is referred to as having a "gaussian-like" intensity profile. The beam enters the first aspheric lens 510 perpendicular to a first side 509 and exits the second side 511 of the first aspheric lens 510. The second side 511 includes an at least partially concave curvature such that a width of the first aspheric lens 510 is smaller at a center portion of the first aspheric lens 510 relative to a peripheral portion of the first aspheric lens 510. The beam enters the second aspheric lens 512 from a first side 513 and exits from a second side 515. The first side 513 of the second aspheric lens 512 includes an at least partially convex curvature such that a center portion of the second aspheric lens 512 is a greater width relative to a peripheral portion of the second aspheric lens 512. The beam exiting the output end 504 has a substantially uniform beam intensity. The shape of the first aspheric lens 510 is determined based on the intensity profile of the beam entering the input end 502 of the beam converting optic 110. The shape of the second aspheric lens 512 is determined based on the distance between the first and second aspheric lenses 510, 512 and the predetermined shape of the intensity profile of the beam exiting the output 504 of the beam converting optic 110. As used herein, a uniform beam intensity is referred to as having a "top-hat" intensity profile which is indicative of a more uniform intensity when compared to a Gaussian-like intensity profile.

Figure 5B:
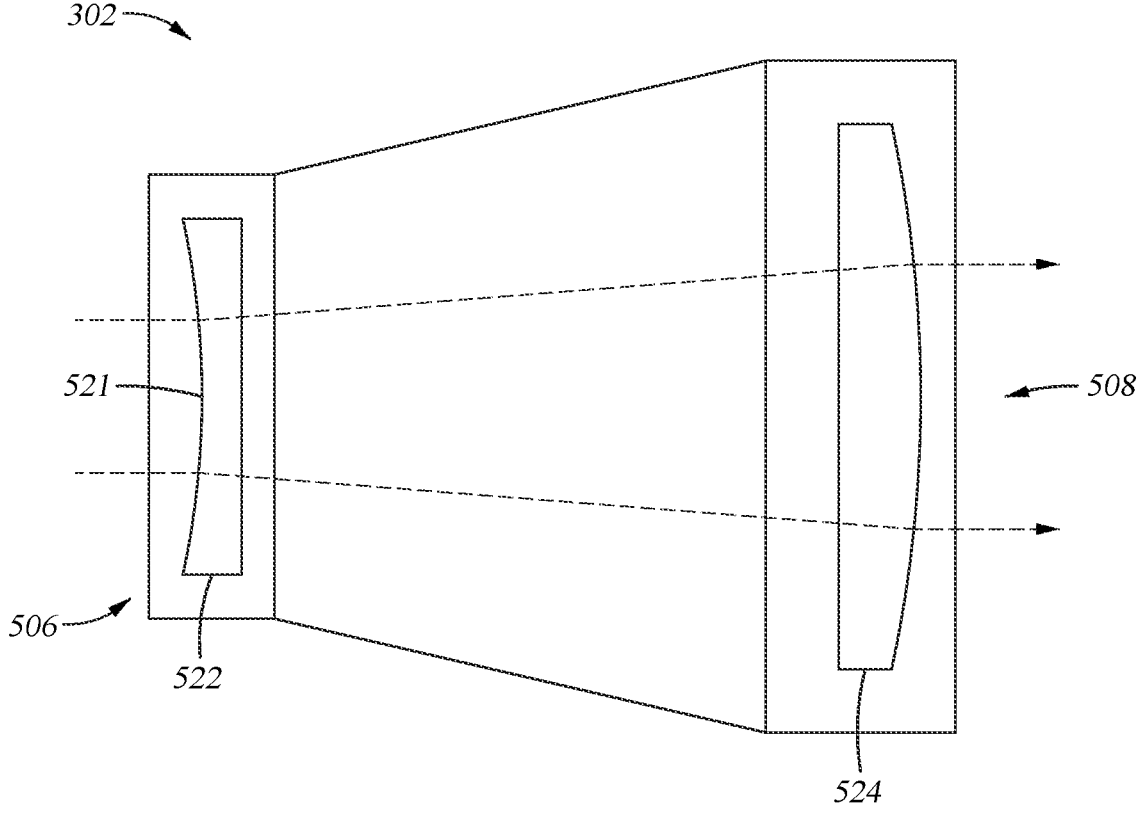
FIG. 5B depicts a side cross-sectional schematic view of a beam expander in accordance with one embodiment of the present disclosure.

FIG. 5B depicts a side cross-sectional schematic view of a beam expander 302. In some embodiments, the beam expander 302 is telescopic, such as a Galilean telescope. The beam expander 302 includes a first curved lens 522, such as a diverging lens, such as an aspheric shaped lens, disposed at or proximate to an input end 506 and a second curved lens 524, such as a converging lens, such as an aspheric shaped lens, disposed at or proximate to an output end 508 of the beam expander 302. The first curved lens 522 is plano-concave or biconcave in shape and the second curved lens 524 is plano-convex or biconvex in shape. In some aspects, the first curved lens 522 is configured to expand a spot size of the laser.

Figure 6A:
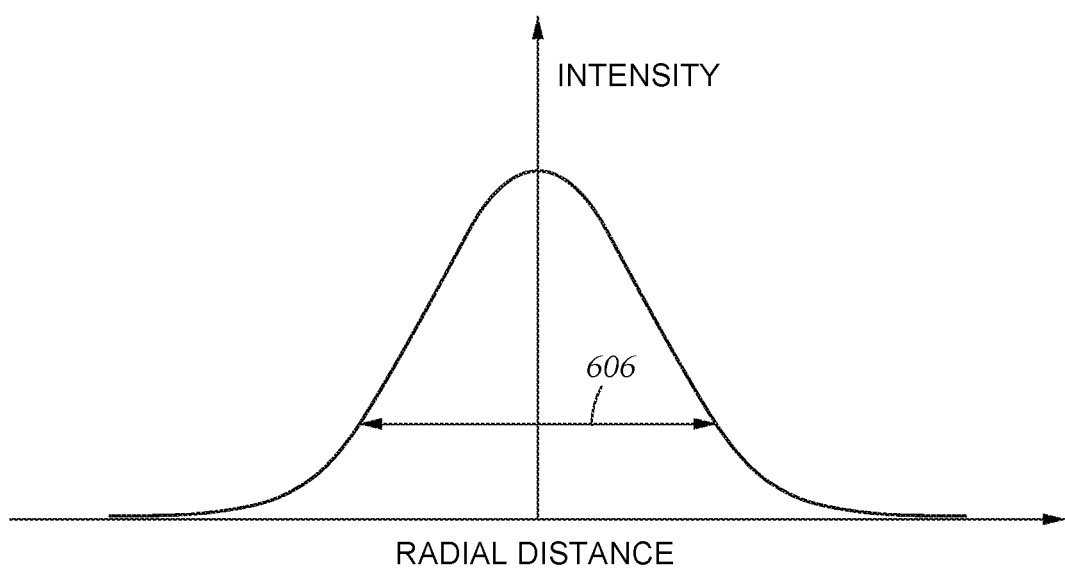
FIG. 6A depicts an intensity profile of an expanded beam relative to radial distance of a beam spot, in accordance with one embodiment of the present disclosure.
Figure 6B:
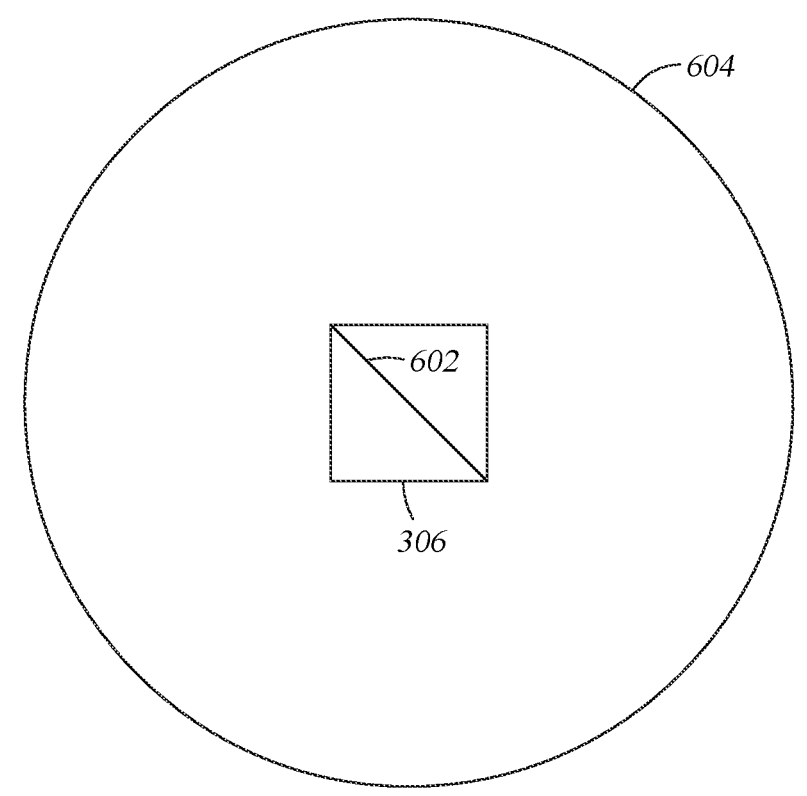
FIG. 6B depicts a spot size of an expanded beam relative to a beam splitter size, in accordance with one embodiment of the present disclosure.

FIG. 6A depicts an intensity profile of an expanded beam relative to radial distance of a beam spot. As used herein, a "spot size" refers to a circular area with a spot radius defined by a radial distance from the center of the beam axis (e.g., having maximum intensity) to a location radially outward of the center in which the intensity is reduced to $1/e^2$ of maximum intensity. The expanded beam is directed to the beam splitter 306 and the spot size is sized to have an intensity width 606 (e.g., twice the spot radius) at least twice the diagonal distance 602 of the beam splitter 306, or about 3 times, or about the square root of 2 times, or about 1.25 times to about 10 times the diagonal distance 602 of the beam splitter 306. The spot size is substantially larger than the surface area of the beam splitter 306 in order to reduce interference effects that are characteristic of the peripheral portion of the Gaussian-like intensity profile of the expanded beam. The spot size 604 of the expanded beam relative to the beam splitter 306 size is shown in FIG. 6B. The beam splitter 306 can have a diagonal distance 602 of about 30 mm to 100 mm, such as about 50 mm to about 70 mm.

Figures 7A, 7B:
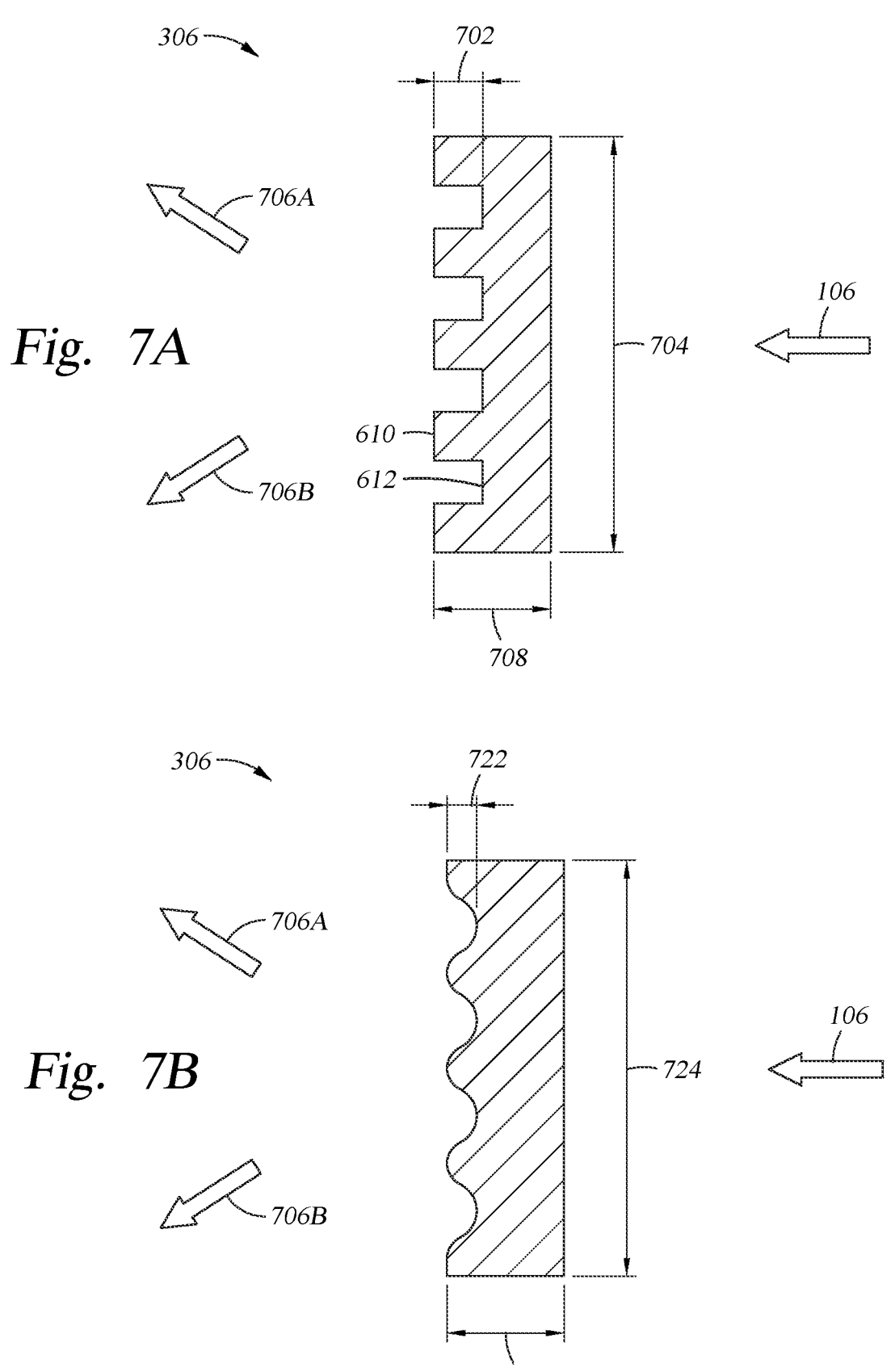
FIG. 7A depicts a cross-sectional view of a beam splitter with box shaped phase grating features, in accordance with one embodiment of the present disclosure.
FIG. 7B depicts a cross-sectional view of a beam splitter with sinusoidal shaped phase grating features, in accordance with one embodiment of the present disclosure.

FIG. 7A depicts a cross-sectional side view of a beam splitter 306 having box shaped grooves and FIG. 7B depicts a cross-sectional side view of a beam splitter 306 having sinusoidal shaped grooves. The beam splitter 306 is a reflective phase grating assembly, such as a glass assembly or a prism assembly. In some embodiments, which can be combined with other embodiments described herein the beam splitter 306 is coated with a metal such as aluminum. The beam splitter 306 includes three dimensional phase grating features. The phase grating features are reflective and include a uniform reflector that covers the grating features, or the phase grating features are transmissive and include an anti-reflective coating. In some embodiments, which can be combined with other embodiments disclosed herein, the phase grating features include grooves that are box shaped (FIG. 7A), or sinusoidal shaped (FIG. 7B). The beam splitter 306 having box shaped groves include peak portions 610, 732 and valley portions 612, 730. In some embodiments, which can be combined with other embodiments described herein, the beam splitter is reflective, and the distance 702, 722 between the peak portions 610, 732 and the valley portions 612, 730 is equivalent to about ¼ of a wavelength of the beam. The valley portions 612, 730 and the peak portions 610, 732 are 180 degrees out of phase with one another. The beam enters the beam splitter 306 at an angle and reflects either the peak portions 610, 732 and valley portions 612, 730 and is consequently split into a first beam and a second beam with substantially equal intensity.

The beam enters the beam splitter 306 along a propagation path 106 and splits into a first propagation path 706A and a second propagation path 706B. In some embodiments, which can be combined with other embodiments described herein, the beam splitter 306 is transmissive, and includes a refractive index of the medium times the distance 702, 722 between the peak portions 610, 732 and the valley portions 612, 730 that is equivalent to about ½ of a wavelength of the beam. The distance 702, 722 is determined by a grating equation represented by Equation 1 shown below.

$$d \times \sin\vartheta = m\lambda, \qquad \text{Equation (1)}$$

d is a period of the grating which is a distance between two adjacent valley portions (e.g., two adjacent valley portions of 612, two adjacent valley portions of 730), $\upsilon$ is a separation angle between the output beams (e.g., about 90 degrees), m is the order of a diffractive light, and $\lambda$ is the wavelength.

A thickness 708, 728 of the beam splitter 306 is determined by the pattern of the grating features. A height 704, 724 of the beam splitter 306 is sized to cover the device 310.

FIG. 8 depicts a flow diagram of an example method 800 for fabricating hologram devices in accordance with one embodiment of the present disclosure. The method includes, at operation 802, directing a beam from a laser 104 to a central mirror 112. The central mirror 112 is disposed in a central region of a support table 114. The support table 114 includes a plurality of process chambers 102 surrounding the central mirror 112. The beam is directed from the laser 104 to the central mirror 112 along a propagation path 106. A beam diverting mirror 108 is disposed between the laser 104 and the central mirror 112 and/or a beam converting optic 110 is disposed between the laser 104 and the central mirror 112, as described above.

At operation 804, the beam is directed from the central mirror 112 to a first chamber of the plurality of process chambers 102 disposed on the support table 114. Alternatively, the central mirror 112 directs a beam to a diverting assembly 202 (e.g., as shown in FIG. 2B). At operation 806, the beam is expanded in a beam expander 301 disposed in the first chamber 102. The beam is expanded and directed to a beam splitter 306. The beam splitter 306 is disposed in each of the plurality of process chambers 102. At operation 808, the beam is split to a first beam in a first direction and a second beam in a second direction. At operation 810, the first beam is directed from the beam splitter 306 to a first mirror 304A, and at operation 812, the second beam is directed from the beam splitter 306 to a second mirror 304B. In one embodiment, the first and second mirrors 304A, 304B are fixed mirrors. In another embodiment, the first and second mirrors 304A are rotatable along three axes.

The first mirror 304A directs the first beam to a third mirror 308A (e.g., along first scan axis 312A) and the second mirror 304B directs the second beam to a fourth mirror 308B (e.g., along second scan axis 312B). The third and fourth mirror 308A, 308B are translatable about the first and second scan axis 312A, 312B, respectively, and rotatable about at least three axes, such as about 3 to about 6 axes. At operation 814, a first side of a device 306 is exposed to the first beam and a second side of the device 306 is exposed to the second beam. The first and second beam interfere at locations within and/or on the device 306 to create holograms thereon. In some embodiments, which can be combined with other embodiments described herein, the first beam and the second beam include substantially the same beam characteristics, such as angle of incidence, phase, and wavelength. The first and second beam spatially coincide within the device to form a fringe pattern formed by the interfering beam waves. The fringe pattern includes a range of energy intensity that is emitted to the device (e.g., a photosensitive device) changing the refractive index of portions of the device. In particular, at least a first portion of the device is exposed to a high energy intensity (e.g., intensity of 1) resulting in a change of index at the first portion of the device. At least a second portion of the device is exposed to a portion of the fringe pattern with less or no energy intensity (e.g., intensity of 0), and the second portion of the device maintains an unchanged index.

In summation, apparatus and methods are provided for fabricating optical devices. The apparatus and methods described herein enable propagating, reflecting, and/or grating one or more beams to create a plurality of hologram devices within a plurality of device process chambers. A single laser is used to generate a plurality of devices which increases throughput of hologram devices with good modulation.

Certain features, structures, compositions, materials, or characteristics described herein may be combined in any suitable manner in one or more embodiments. Although the present disclosure herein has been described with reference to particular embodiments, it is to be understood that these embodiments are merely illustrative of the principles and applications of the present disclosure. It will be apparent to those skilled in the art that various modifications and variations can be made to the method and systems of the present disclosure. Thus, it is intended that the present disclosure include modifications and variations that are within the scope of the appended claims and their equivalents.

The invention claimed is:

1. An apparatus for fabricating optical devices, comprising:
   a support table comprising a plurality of process chambers;
   a laser configured to direct a beam along a propagation path to each of the plurality of process chambers;
   a central mirror centrally disposed among the plurality of process chambers;
   a beam splitter disposed within each of the plurality of process chambers, the beam splitter configured to receive the beam from the central mirror and emit a first beam in a first direction and a second beam in a second direction; and
   a first mirror configured to direct the first beam to a device; and a second mirror configured to direct the second beam to the device, wherein the each of the first and second mirror is rotatable in at least three axes.

2. The apparatus of claim 1, further comprising a beam converting optic disposed between the laser and the central mirror relative to the propagation path and configured to receive the beam from the laser and emit the beam to the central mirror, the beam converting optic configured to receive the beam comprising a first intensity profile and to emit the beam comprising a second intensity profile.

3. The apparatus of claim 2, wherein the beam converting optic is a tube comprising a first aspheric lens on an inlet end and a second aspheric lens on an outlet end of the tube.

4. The apparatus of claim 1, further comprising a beam diverter disposed between the laser and the beam converting along the propagation path and configured to receive the beam from the laser and divert the beam to the beam converting optic.

5. The apparatus of claim 4, wherein the beam diverter is a mirror.

6. The apparatus of claim 4, wherein the beam diverter is a prism.

7. The apparatus of claim 1, further comprising a beam expander configured to expand a size of the beam from the central mirror and emit the beam to the beam splitter.

8. The apparatus of claim 7, wherein the beam expander is disposed in each of the process chambers between the central mirror and the beam splitter along the propagation path.

9. The apparatus of claim 7, further comprising a third mirror configured to direct the first beam from the beam splitter to the first mirror; and a fourth mirror configured to direct the second beam from the beam splitter to the second mirror.

10. The apparatus of claim 1, wherein the laser is a titanium sapphire laser.

11. The apparatus of claim 1, wherein the support table comprises an upper surface, a lower surface, and an opening therethrough, wherein the laser is disposed adjacent to the lower surface of the support table and the plurality of process chambers are disposed on the upper surface of the support table, the laser configured to emit the beam through the opening.

12. The apparatus of claim 1, wherein the support table comprises an upper surface and a lower surface, the laser is disposed adjacent to the upper surface of the support table and adjacent to the plurality of process chambers.

13. An apparatus for fabricating hologram devices, comprising:
   a support table comprising a plurality of process chambers;
   a laser configured to direct a beam along a propagation path to each of the plurality of process chambers;
   a central mirror disposed in a center region of the support table, the plurality of process chambers surrounding the center region of the support table;
   a beam converting optic configured to receive a beam from the laser and emit the beam to the central mirror, the beam converting optic configured to receive the beam comprising a first intensity profile and to emit the beam comprising a second intensity profile, the central mirror configured to sequentially direct the beam from the laser to each of the plurality of process chambers;
   a beam splitter disposed on each of the plurality of process chambers, the beam splitter configured to receive the laser from the central mirror and emit a first beam in a first direction and a second beam in a second direction; and
   a first mirror configured to direct the first beam to an optical target; and a second mirror configured to direct the second beam to the optical target, wherein the first and second mirror is rotatable along three axes.

14. The apparatus of claim 13, wherein the central mirror is rotatable along a single axis.

15. A method for fabricating hologram devices, comprising:
   directing a beam from a laser to a central mirror, the central mirror disposed in a central region of a support table, the support table comprising a plurality of process chambers surrounding the central mirror;
   directing the beam from the central mirror to a first chamber of the plurality of process chambers disposed on the support table;
   expanding the beam from the central mirror in a beam expander disposed in the first chamber;

splitting the beam from the beam expander with a beam splitter disposed in each of the plurality of process chambers, the beam splitter configured to receive the laser from the central mirror and emit a first beam in a first direction and a second beam in a second direction; and directing the first beam from the beam splitter to a first mirror and to a device;

directing the second beam from the beam splitter to a second mirror and to the device, wherein the first and second mirrors are rotatable along three axes; and simultaneously exposing a first side of a device to the first beam and a second side of the device to the second beam.

16. The method of claim 15, wherein directing the beam from the laser to a central mirror, comprises:

directing the beam to a defector, a prism assembly directing the beam to a beam converting optic, the beam comprising a first intensity profile; and converting the first intensity profile to a second intensity profile using the beam converting optic.

17. The method of claim 16, wherein the first intensity profile is a gaussian-like shape and the second intensity profile is non-gaussian shape.

18. The method of claim 15, wherein the first beam comprises a first intensity and the second beam comprises a second intensity, the first and second intensity are substantially equal.

19. The method of claim 15, wherein the laser comprises a power of about 1.0 to about 2.0 watts.

20. The method of claim 15, further comprising directing the beam from the central mirror to a second chamber of the plurality of process chambers disposed on the support table.

* * * * *